(12) United States Patent
Jung

(10) Patent No.: US 8,881,015 B2
(45) Date of Patent: Nov. 4, 2014

(54) SYSTEM AND METHOD FOR DELIVERING DOCUMENTS TO PARTICIPANTS OF WORK-FLOW EVENTS OR TASKS

(75) Inventor: Jongsun Jung, Tustin, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 968 days.

(21) Appl. No.: 12/324,592

(22) Filed: Nov. 26, 2008

(65) Prior Publication Data

US 2010/0131852 A1 May 27, 2010

(51) Int. Cl.
*G06F 3/048* (2013.01)
*G06Q 10/06* (2012.01)
*G06Q 10/10* (2012.01)

(52) U.S. Cl.
CPC .............. *G06Q 10/10* (2013.01); *G06Q 10/06* (2013.01)
USPC ........................................ 715/733

(58) Field of Classification Search
USPC ........................................ 715/733
See application file for complete search history.

(56) References Cited

U.S. PATENT DOCUMENTS

| | | | |
|---|---|---|---|
| 6,219,229 B1 * | 4/2001 | Lee | 361/679.08 |
| 2003/0177070 A1 * | 9/2003 | Viswanath et al. | 705/26 |
| 2005/0216847 A1 * | 9/2005 | Zhu et al. | 715/751 |
| 2007/0299631 A1 * | 12/2007 | Macbeth et al. | 702/187 |
| 2008/0263550 A1 * | 10/2008 | Su et al. | 718/102 |
| 2009/0013043 A1 * | 1/2009 | Tan | 709/205 |

* cited by examiner

*Primary Examiner* — Peiyong Weng
(74) *Attorney, Agent, or Firm* — IP Investment Law Group

(57) ABSTRACT

A system and method for transmitting documents from a document device, such as an MFP. The MFP accesses calendar and workflow servers to determine a list of information items. A user can select an information item for which the document is to be associated and the document device will then determine all of the associated document destinations, e.g., workspaces, email addresses, and the like, and then subsequently transmit the documents to all of the document destinations that are associated with the information item or a subset of the document destination associated with the information item as selected by the user.

23 Claims, 4 Drawing Sheets

SYSTEM AND METHOD FOR DELIVERING DOCUMENTS TO PARTICIPANTS OF WORK-FLOW EVENTS OR TASKS

BACKGROUND OF THE INVENTION

1. Field of the Invention

The present invention relates to computer network systems and, in particular, concerns document devices, such as MFP's, that are capable of capturing and transmitting documents to destinations that are dictated by workflow or event related information.

2. Background of the Related Art

A commonly understood enterprise environment, in the context of today's networked computers, involves an environment where a plurality of computers and other components are networked together. These computers can include such things as servers upon which documents are stored and servers upon which information that relates to various events and workflows is stored. It is generally understood that a workflow can include such things as tasks and events, where multiple participants will be performing different aspects of the tasks or preparing for different features of the event. Generally, a workflow is a process by which information can be managed so that each of the participants who is performing work associated with the task or event receives or completes the appropriate information along the timeline specified by the workflow.

As an example, scheduling software is often used to remind participants of an upcoming meeting. Various tasks for specific participants to be completed by the meeting may also be maintained. When the meeting occurs, it is generally desirable that the information that has been prepared by each of the individual participants also be disseminated to the other participants of the meeting. Preferably, it is desirable to disseminate some or all of this information prior to the meeting so that each of the participants at the meeting can have the opportunity to review some or all of the material prior to the meeting.

Another example of a workflow would be a task, e.g., such as performing a study of a particular business opportunity or the like and preparing a report summarizing the result. In this particular example, the task may involve many different participants each of whom will have a subtask or will have the responsibility of reviewing and approving the materials that have been prepared and associated with performing the task. These are but two simple examples of various workflows that can involve multiple participants, each of which may need materials to be forwarded to them at periodic time intervals.

One present difficulty with document management systems is that the dissemination of information for an event, such as a meeting, or for a task, such as approval of a report by a plurality of people, is often complicated. Generally, if the information is in a documentary form, an individual participant will have to capture the document, such as by scanning or saving the document into a memory. The user must then identify each of the other participants of the event or task who are to receive this document and copy each of these individuals with the materials that the individual participant has developed. Oftentimes, the individual participant may use their own computer on the network and may also transmit the documents to the other participants via email or similar transmission.

In many instances, this method of transmitting the documents to the other participants in a workflow task or event is necessarily complicated. In the specific example of a document or piece of information that is to be scanned, so as to be stored in a document repository, the individual participant must scan and store the document and then subsequently access a personal computer to retrieve the stored document from the document repository and forward it to the other participants. This can be a time consuming and cumbersome process of disseminating information relevant to a specific workflow task or event. In some instances, the ability to disseminate information to a plurality of individuals associated with a workflow task or event can be simplified through the use of mail lists and the like, however, even disseminating the information in this fashion generally requires the individual participant with the document to disseminate to utilize a separate computer system and retrieve the document to be disseminated and also to access the appropriate addresses or destination information of the other participants.

Hence, it will be appreciated from the foregoing, that there is a need for a method and system for more efficiently disseminating information that is associated with workflows. To this end, there is a specific need for a system that will allow electronically captured documents to be disseminated to other participants or destinations associated with an event or task in a workflow in a manner that does not require additional processing steps by the individual participant who is disseminating the document and also, in some instances, would not require the use of additional computer systems other than the document device.

SUMMARY OF THE INVENTION

The aforementioned needs are satisfied by the system of the present invention which, one aspect, comprises a computer system for a plurality of participants, the system comprising at least one server that contains data about information items including participants associated with the information items, a communication system that interconnects the plurality of participants, and at least one document device whereby electronic versions of physical documents are captured, the at least one document device having a user interface to allow a participant to induce the document device to perform one or more functions and further allows the at least one document device to provide information to the participant, wherein the at least one document device communicates with the at least one server so as to identify information items so that the first participant can select an information item and, upon selecting the information item, the at least one document device transmits the electronic version of the physical document to one or more other participants associated with the information item.

Another aspect comprises a networked system comprising at least one information item server that contains data about tasks and events including participants associated with the task or event, a communications system that interconnects a plurality of participants, and a document device that captures electronic versions of physical documents, wherein the document device includes a user interface that allows a user to select an electronic version of a physical document, wherein the document device is communicably coupled to the at least one information item server so that the document device permits the user to select participants associated with a task or event to receive the electronic version of the physical document via the user interface and wherein the document device transmits the electronic version of the physical document via the communications system to the selected participants.

Yet another aspect comprises a method of managing documents, the method comprising capturing electronic versions of documents in a document device, providing information via the document device to a user to allow the user to select an information item that is to be associated with the electronic version of the document, displaying participants associated with the information item to the user via the document device to allow the user to select participants who are to receive the electronic version of the document and transmitting the electronic version of the document from the document device to the participants selected by the user.

These and other objects and advantages will become more apparent from the following description taken in conjunction with the accompanying drawings.

DETAILED DESCRIPTION OF THE PREFERRED EMBODIMENT

Figure 1:
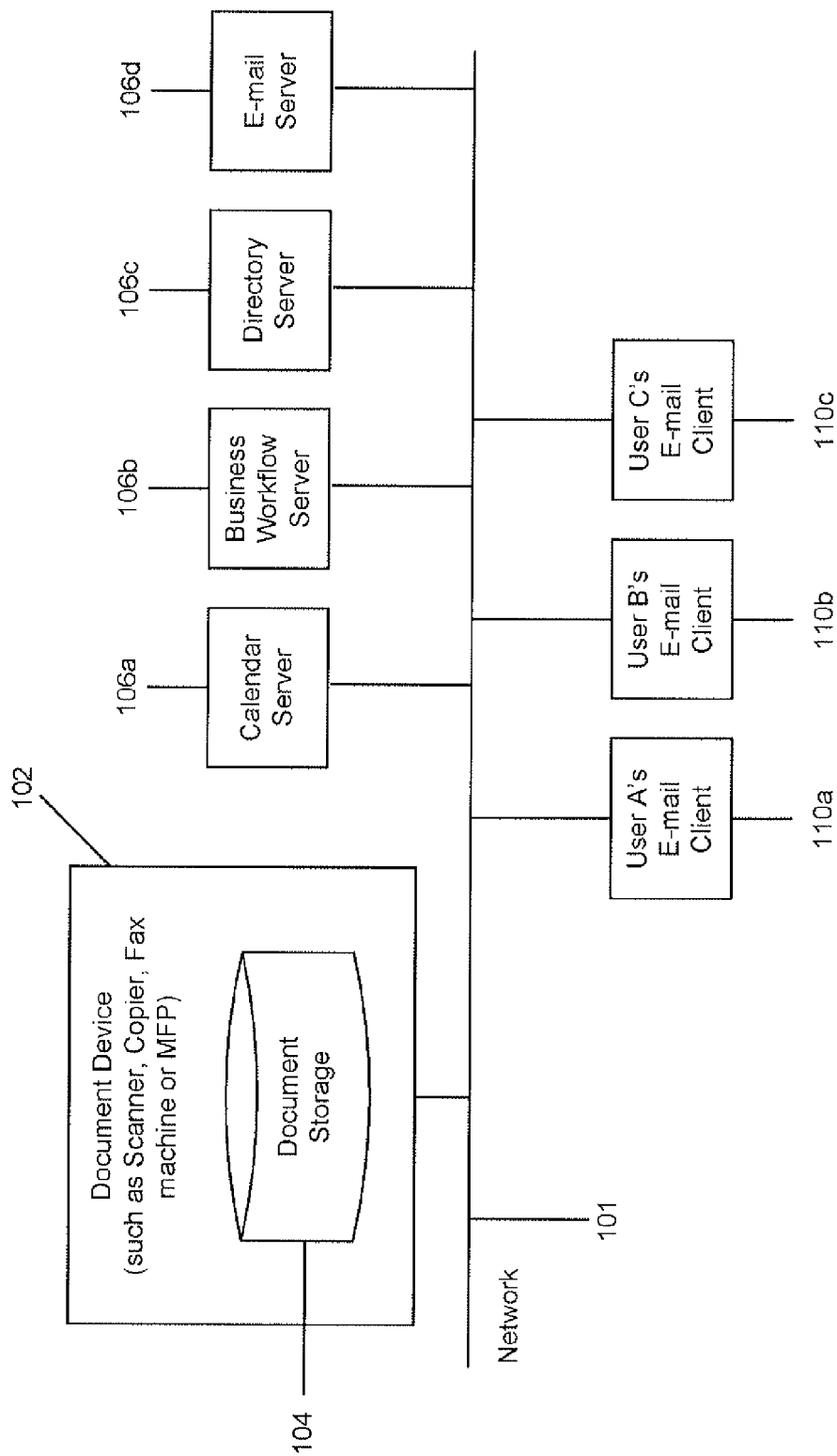
FIG. 1 is a block diagram generally illustrating a computer system whereby documents in a document device can be provided to participants based upon workflows contained within a plurality of different workflow related servers.

Reference will now be made to the drawing wherein like numerals refer to like parts throughout. Referring initially to FIG. 1, an enterprise system 100 comprised of a network 101 is shown. The network 101 provides a communication bridge between a plurality of different components. One such component is a document device 102, which incorporates a document storage capability 104. In one particular implementation, the document device 102 can be a multifunction peripheral (MFP) device that incorporates the functionality of a scanner, copier, and fax. In this particular implementation, the document device has document storage 104 whereby a plurality of documents can be stored. It will be appreciated, however, that the network 101 may also couple a variety of other document storage devices, memories, servers, and the like where documents can be stored without departing from the spirit of the present invention. In one implementation, a user or individual participant can create documents to be stored within the document storage 104 by scanning these documents via the document device 102 or by otherwise transmitting these documents to the document device 102.

As is also illustrated in FIG. 1, the network 101 connects the document device 102 to a plurality of servers 106 that provide relevant information to the document device 102 to thereby allow the document device 102 to provide relevant documents to a variety of different information items, which include events and tasks. For example, the document device 102 can access a calendar server 106*a* via the network 101 for scheduled meeting information and can further access a business workflow server 106*b* for task information.

The calendar server 106*a* may include information that identifies all of the participants who are going to attend a particular meeting so that an individual participant with a document that has been captured by the document device 102 can provide the document to some or all of the members who are going to attend the meeting as identified by the calendar server 106*a*. Similarly, the business workflow server 106*b* may include all of the participants who are participating in completing a particular task, e.g., preparing a report and the like, and the business workflow server 106*b* may provide information to the document device 102 to thereby allow the document device 102 to allow the user to be able to provide the relevant information to all of the participants of the task.

The manner in which the information may be provided can be performed in any of a number of different manners but, in one particular implementation, can be performed by providing email to an email client 110 associated with the user. In this particular implementation, the network 100 may also include an email server 106*d* that contains the email information that can be correlated with the information provided by the calendar server 106*a* or the business workflow server 106*b*. It will be appreciated that the servers 106 may comprise a single server or a plurality of many different servers and, as such, a directory server 106*c* may also be employed so as to provide the information to the document device 102 as to which is the appropriate server to access.

The user clients 110 may generally comprise a plurality of different email accounts for each of the participants that is identified with a particular information item so that the document device 102 can provide a copy of the document in electronic format to the individualized address of the other participants of the information item. It will be appreciated that the documents can be provided as emails, hyperlinks to internet or intranet, web addresses, or any of the number of known manners of transmitting documents without departing from the spirit of the present invention. It will be further appreciated that the diagram of FIG. 1 is simply exemplary of one possible system 100 whereby one or more document devices may be able to transmit documents directly to clients corresponding to participants of information items, such as events or tasks, without departing from the spirit of the present invention.

Figure 2:
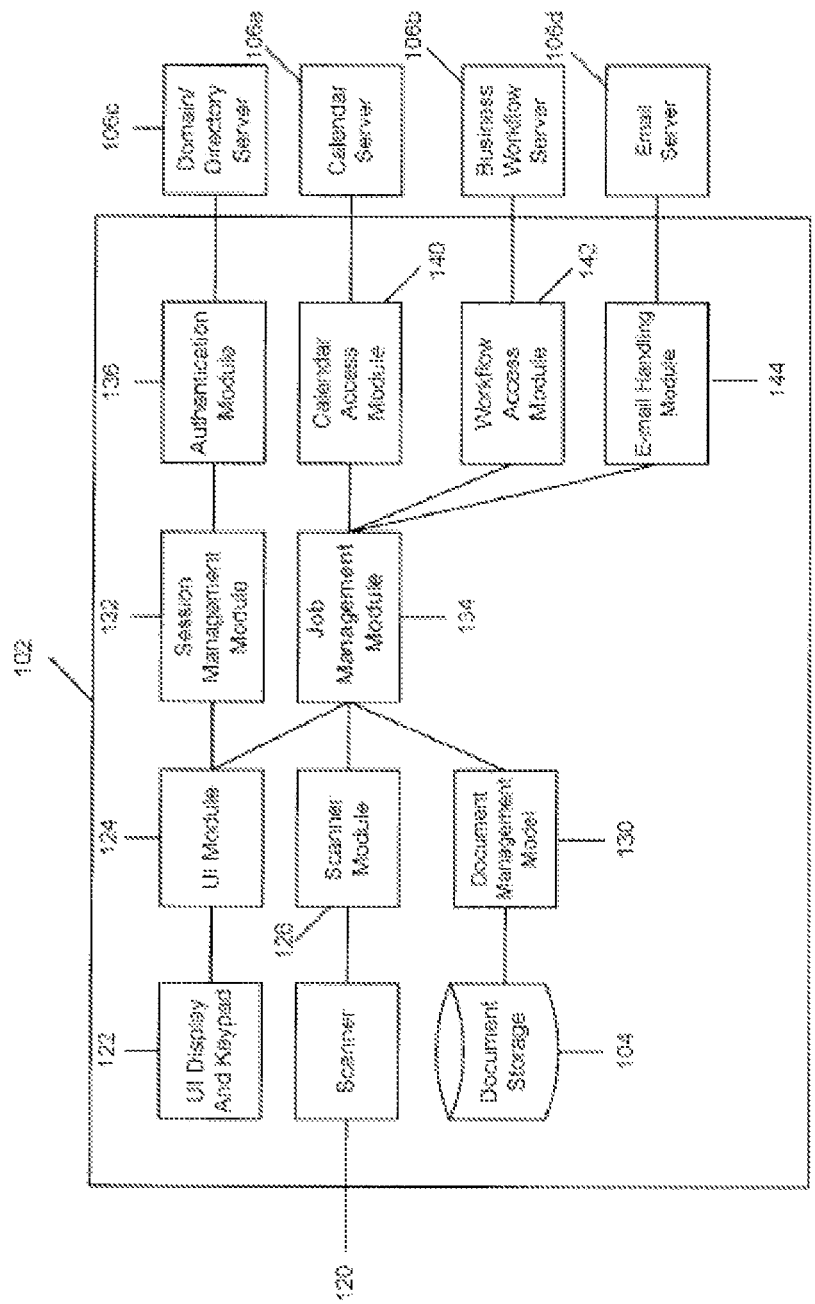
FIG. 2 is an exemplary block diagram of the document device of FIG. 1.

FIG. 2 is a block diagram that provides an exemplary illustration of the document device 102. It will be appreciated that FIG. 2 is a functional block diagram that illustrates the functionality that can be implemented by the document device 102 but it will be appreciated that the functionality described herein can be implemented in any of a variety of different ways. As shown, the document device 102 includes document storage 104 whereby documents that are obtained or otherwise captured by the document device 102 are stored. As is also shown, the document device 102 includes a scanner 120 whereby electronic images of physical documents can be captured. The scanner 120 can be any of a number of known scanners in the art, and includes an associated scanner module that converts the scanned image into an accessible electronic document or file that can be stored in the document storage 104 in a manner known in the art. The storage of the document in the document storage can generally be controlled by a job management module 134 which regulates the functions performed by the document device 102 in a well-known manner and a document management module 130 which stores the electronic representations of the scanned documents in a manner that is also known in the art.

As is also shown in FIG. 2, the document device 102 also includes a user interface display and keyboard 122 with an associated module 124. In this way, instructions can be provided to the user or individual participant and the user or individual participant can provide instructions to the document device 102 relating to the storage and transmission of documents in the document storage 102 and to other users or participants in a manner that will be described in greater detail below.

As is also illustrated in FIG. 2, the device 102 may also include other functional modules including a session management module 132 which manages the interactions between a user and the device 102 during a particular session.

Further, other functional modules may include an authentication module 136 whereby the document device 102 can access the domain/director server 106 to provide the appropriate address information and to also authenticate that the user is authorized to make use of the document device 102 and to also associate with the user the particular information items for which the user is a participant. Further, the document device 102 may also include a calendar access module 140 that provides the functionality to address the calendar server 106a, a workflow access module 142 that provides the functional capability of accessing the workflow server 106b, and an email handling module 144 that provides the functionality for the document device 102 to access the email server 106d.

Figure 3:
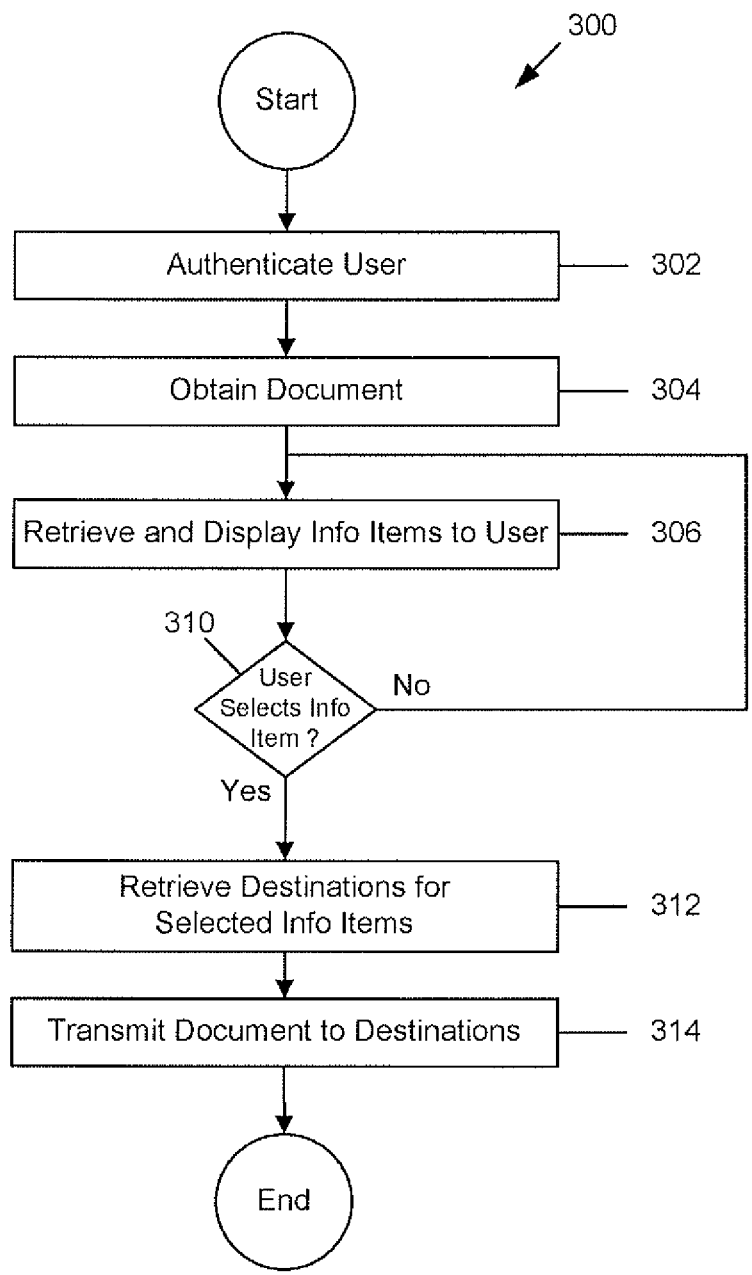
FIG. 3 is an exemplary flow chart of one operation of the document device of FIG. 1 as it provides documents to participants based upon workflow information provided by the system of FIG. 1.

Referring now to FIG. 3, the overall operation of the document device 102 as it provides documents to destinations associated with particular information items, such as events and tasks, will now be described. From a start state, the document device 102 generally authenticates the user in state 302. In this particular state, the document device 102 communicates with the domain directory server 106 via the authentication module 136 to determine whether the user that has accessed the document device 102 is authorized to use the document device 102. Further, the authentication module 136 may also be accessing via the directory server 106c all of the information items, e.g., events and tasks that are associated with the user.

Subsequently, one or more documents may then be captured or obtained, in state 304, by the document device 102. In one implementation, a physical document can be captured or obtained by the document device 102 as a result of the user physically scanning the document using the scanner functionality of the device 102. Alternatively, the documents can be captured as a result of the documents being electronically transmitted to the document device 102 via fax or email protocols. It will be appreciated that any of a number of manners of obtaining or capturing the documents call be implemented without departing from the spirit of the present invention.

Once the document has been obtained or captured, the information items associated with the user are retrieved and displayed in state 306. It will be appreciated that a particular user may be associated with a variety of different upcoming meetings as contained in the calendar server 106a, as well as being associated with a plurality of different tasks as identified by the business workflow server 106b. Thus, in state 306, the user is preferably provided a menu of the different information items that they are associated with via the user interface display 122 (FIG. 2) which thereby allows the user to select the appropriate information item(s) for which the document obtained in state 304 is to be forwarded.

When the document device 102 determines that the user has selected a particular information item in decision state 310, the destination for the selected information item is then retrieved in state 312. The destinations may be stored either in the calendar server 106a, the business workflow server 106b, or separately in the directory server 106c. In any event, the document device 102 obtains the destination for each of the other participants that is associated with the information item, in state 312. Subsequently, the document device 102 then transmits the documents to the destination in state 314. In one particular implementation, the document delivery job typically consists of the following steps: acquiring the documents, converting the documents into a format that can be attached to an email (if needed), storing the converted documents temporarily or permanently depending upon implementation, creating emails with the documents attached and sending the emails to all recipients via the email server 106d.

In one particular example, the recipients of the emails can include all the invitees of a particular meeting contained within the calendar server 106a or all of the approvers in the approver line of a workflow task as identified in the business workflow server 106b. It will also be understood that a destination can also include not just an individual e-mail address but also a workspace or file associated with the information item.

It will be appreciated that the document device 102 thereby allows a user to capture a particular document using a document device 102, such as an MFP, and then directly from the MFP select all of the other participants or document destinations of a particular information item, such as a task or meeting, and directly transmit the documents to the other participants or destinations. In this way, the user can more efficiently disseminate the document as it does not require the user to access a separate computer to access the document captured by the document device 102. Nor does it require the user to select or otherwise identify the participants in the information item as the other participants are automatically provided to the document device 102 to thereby allow the document device 102 to directly send the document to the other participants.

Figure 4:
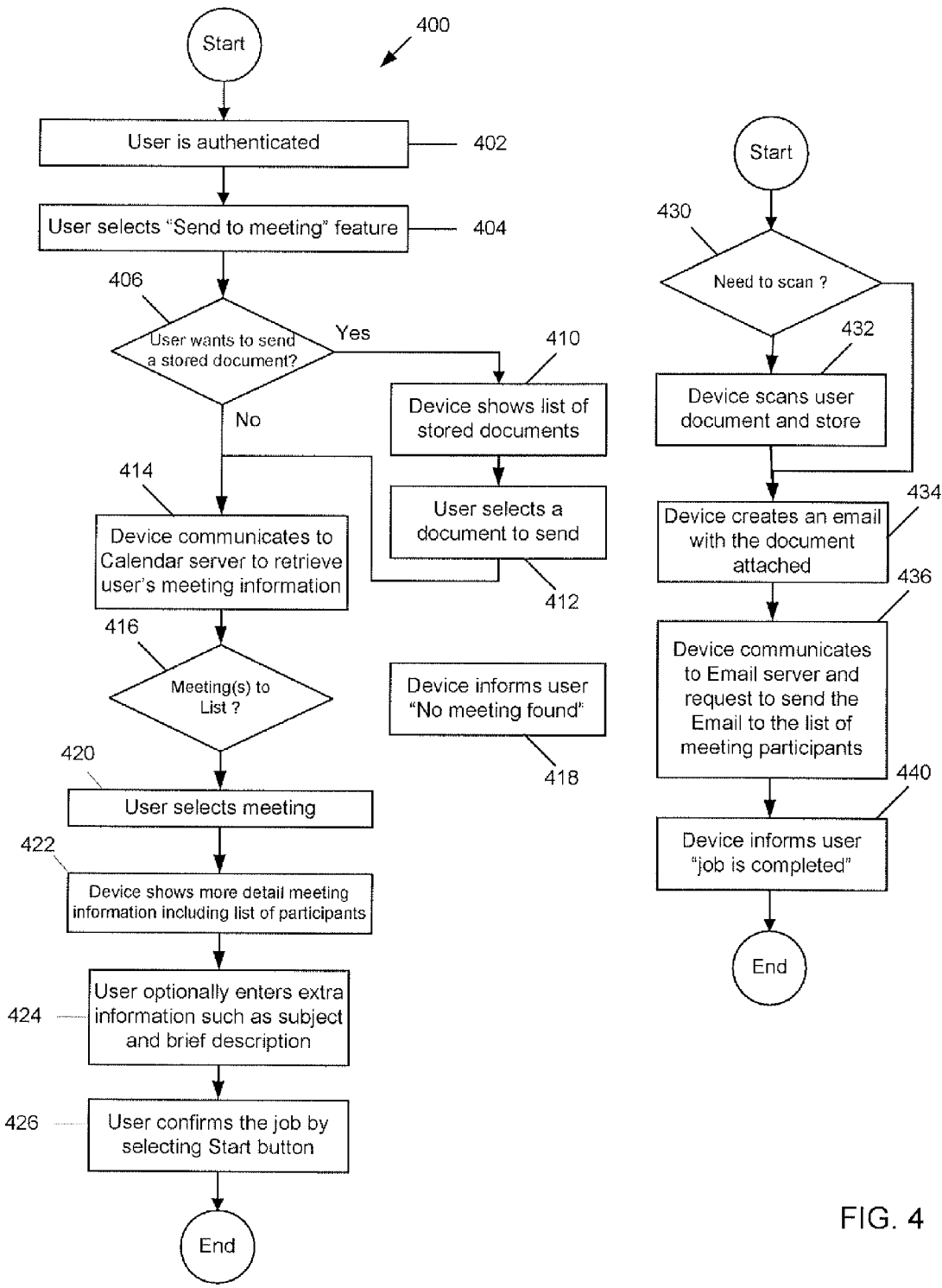
FIG. 4 is an exemplary flow chart illustrating the operation of the document device of FIG. 1 as it provides documents to participants or clients based upon an event, such as a meeting.

FIG. 4 is another exemplary flowchart which illustrates the operation of the document device 102 as it transmits electronic copies of documents that are either captured by or otherwise stored in the document device 102. More specifically, as shown in FIG. 4, the document device 102, from a start state, authenticates the user in state 402 in the manner that is substantially the same as the manner described above in conjunction with state 302 of FIG. 3. Once the user has been authenticated, the document device 102 then determines, in decision state 406, whether the user wishes to send a previously stored document. Generally, the document device 102 can be configured so as to ask this question of the user when the user has become authenticated and the user can then indicate that they do wish to send the stored document using the user interface or keyboard in a known manner. In the event that the user does wish to send a previously stored document, the document device 102 is preferably configured so as to show, in state 410, a list of documents that are stored in the document storage 104. In one implementation, the list may simply be those documents for which the user is already associated, i.e., those documents that the user has created, or it may include all of the documents within the document storage 104.

The user will then select the document to send, in state 412, using the user interface and keyboard 122 in a known manner. In this particular implementation, the document device 102 then communicates, in state 414, with the calendar server 106a to retrieve the user meeting information. It will be appreciated that the device, in state 412, could alternatively be communicating with the workflow server 106b to retrieve the user's workflow information in the same manner.

The document device 102 then determines whether there are meetings or, alternatively, workflows to list and, if there are no such meetings or workflows, advises the user of this in state 418. In the event that there is one or more meetings or, alternatively, workflows, these meetings are then displayed to the user thereby allowing the user to select the appropriate meeting or workflow in state 420 using the user interface display and keyboard 122 (FIG. 2). Upon selecting a particular meeting or, alternatively, workflow, the device 102 will then provide more information about the meeting or workflow including a list of the participants, in state 422. The user may then be provided the opportunity to optionally enter extra information such as the subject and a brief description relating to the document in state 424. The user also can have the ability of selecting the entire list of participants or destinations with the associated meeting or, alternatively, workflow, as displayed in state 422 or some subgroup thereof.

Once the user has identified the list of participants or destinations that is associated with the meeting or workflow for which the document is to be transmitted, the user can then confirm this, in one implementation, by selecting a start button in state 426. Subsequently, the document device then determines, in decision state 430, whether there is a need to scan the document, in state 430, or whether a previously selected stored document is to be transmitted to the list of participants. If there is a need to scan the document, the device 102 prompts the user to implement the scan procedure, in state 432, whereby a physical copy of the document is scanned in a known manner and is stored in the document storage 104. Subsequently, the device creates an email with an electronic version of the document attached, in state 434, and then communicates to the email server a request to send the email to the list of the meeting participants or, alternatively, workflow participants, in state 436. Subsequently, the user is provided with an indication that the job has been completed in state 440.

It will be appreciated that the above-described process has been described primarily in conjunction with communicating documents to members of a meeting but can also be used to communicate the documents to people that are associated with a particular workflow. The documents can, of course, be either previously stored documents or documents that are scanned at the moment the user is making use of the document device 102. Again, the case of transmitting the documents to a group of participants is greatly enhanced as the user simply has to select or scan the document, select or scan an associated information item, and then the document device will automatically send the document to all of the document destinations that are associated with the particular information item.

Although the above disclosed embodiments have shown, described or pointed out the novel features of the invention as applied to the above-disclosed embodiments, it will be understood that various omissions, substitutions, and changes in the form of the detail of the device, systems and methods shown may be made by those skilled in the art without departing from the scope of the present invention. Consequently, the scope of the invention should not be limited to the foregoing descriptions, but should be defined by the appended claims.

What is claimed is:

1. A multifunction peripheral (MFP) system comprising:
 a document device for capturing electronic versions of a document;
 a job management module, coupled to the document device, configured to:
  determine whether to capture the document or to transmit the document selected from previously stored documents,
  determine an availability of meeting information, workflow information, or a combination thereof for providing a list of participants associated with the meeting information, the workflow information, or a combination thereof, and
 an e-mail handling module, coupled to the job management module, configured to transmit the document based on the availability for distributing the document to a workspace associated with an event, a task, or a combination thereof and an e-mail including an approver from an approver line of the task as a recipient, the document delivered to the participants for approving the document.

2. The system of claim 1, wherein the meeting information includes the event to which the participants are to attend.

3. The system of claim 2, wherein the meeting information includes meetings.

4. The system of claim 3, wherein the email-handling module is configured to transmit the document to all of the participants attending the meeting.

5. The system of claim 1, wherein the workflow information includes the task that the participants are to perform.

6. The system of claim 5, wherein the task comprises preparing the document that has to be approved by the participants.

7. The system of claim 6, wherein the e-mail handling module is configured to transmit the document to all of the participants who need to approve the document.

8. The system of claim 1, wherein the e-mail handling module is configured to transmit the document via an e-mail system.

9. The system of claim 1, further comprising a document storage, coupled to the job management module, having a memory configured to store electronic versions of the document.

10. The system of claim 9, further comprising a user interface module, coupled to the job management module, configured to select a previously stored document for transmission to one or more other participants associated with the meeting information, the workflow information, or a combination thereof.

11. A multifunction peripheral (MFP) system comprising:
 a document device for capturing electronic versions of a document;
 a document storage, coupled to the document device, configured to store electronic versions of the document;
 a user interface module, coupled to the document storage, configured to select a document selected from previously stored document;
 a job management module, coupled to the document storage, configured to:
  determine whether to capture the document or to transmit the document selected from previously stored documents,
  determine an availability of meeting information, workflow information, or a combination thereof for providing a list of participants associated with the meeting information, the workflow information, or a combination thereof, and
 an e-mail handling module, coupled to the job management module, configured to automatically transmit the document based on the availability for distributing the document to a workspace associated with an event, a task, or a combination thereof and an e-mail including an approver from an approver line of the task as a recipient, the document delivered to the participants for approving the document.

12. The system of claim 11, further comprising:
 a calendar access module, coupled to the job management module, configured to receive the meeting information with the participants who have been invited to a meeting; and
wherein:
 the e-mail handling module is configured to deliver the electronic version of the document to all of the participants invited to the meeting.

13. The system of claim 11, further comprising:
 a workflow access module, coupled to the job management module, configured to receive task information with the participants who have to approve the document; and wherein:
the e-mail handling module is configured to deliver the electronic version of the document to all of the participants who have to approve the document.

14. The system of claim 11, wherein the e-mail handling module is configured to transmit the document via an email system.

15. The system of claim 11, wherein the document storage, having a memory, is configured to store a list of the previously stored documents.

16. The system of claim 11, further comprising a user interface module, coupled to the job management module, configured to select a previously stored document for transmission to one or more other participants associated with an information item.

17. The system of claim 11, wherein the e-mail handling module is configured to forward the electronic versions of the document stored in a document device to the participants.

18. The system of claim 11, wherein the electronic version of the document comprises either the document that has been scanned into the MFP or has been received by the MFP in an electronic or a fax format.

19. A method of operation of a multifunction peripheral (MFP) system comprising:
determining whether to scan a document or to transmit the document selected from previously stored documents,
determining an availability of meeting information, workflow information, or a combination thereof for providing a list of participants associated with the meeting information, the workflow information, or a combination thereof; and
transmitting the document based on the availability for distributing the document to a workspace associated with an event, a task, or a combination thereof and an e-mail having an approver from an approver line of the task as a recipient.

20. The method of claim 19, wherein displaying the availability includes displaying events and tasks.

21. The method of claim 20, further comprising displaying the participants associated with the meeting information, the workflow information, or a combination thereof includes displaying the participants invited to a meeting or the participants associated with the task.

22. The method of claim 19, wherein transmitting an electronic version of the document comprises translating the document into an e-mail compatible form and then transmitting the document to the participants via e-mail.

23. The method of claim 19, further comprising scanning the document, receiving a fax copy of the document or receiving an electronic version of the document.

* * * * *